United States Patent
Horikawa

(10) Patent No.: US 7,721,290 B2
(45) Date of Patent: May 18, 2010

(54) JOB SCHEDULING MANAGEMENT METHOD USING SYSTEM RESOURCES, AND A SYSTEM AND RECORDING MEDIUM FOR IMPLEMENTING THE METHOD

(75) Inventor: Shigeru Horikawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1582 days.

(21) Appl. No.: 10/714,597

(22) Filed: Nov. 18, 2003

(65) Prior Publication Data

US 2005/0010608 A1 Jan. 13, 2005

(30) Foreign Application Priority Data

Jul. 8, 2003 (JP) ............... 2003-193259

(51) Int. Cl.
*G06F 9/46* (2006.01)
*G06F 15/16* (2006.01)
*G06F 15/173* (2006.01)

(52) U.S. Cl. ............ 718/104; 718/100; 718/102; 718/105; 709/201; 709/205; 709/224; 709/229

(58) Field of Classification Search ......... 718/100, 718/102, 104, 105; 709/201, 205, 224, 229; 714/48; 707/100
See application file for complete search history.

(56) References Cited

U.S. PATENT DOCUMENTS

| 4,839,798 | A | | 6/1989 | Eguchi et al. | |
|---|---|---|---|---|---|
| 5,513,354 | A | * | 4/1996 | Dwork et al. | ............... 718/106 |
| 5,870,604 | A | | 2/1999 | Yamagishi | |
| 6,938,256 | B2 | * | 8/2005 | Deng et al. | ............... 718/104 |
| 7,036,041 | B2 | * | 4/2006 | Akamatu et al. | ............... 714/6 |
| 7,124,119 | B2 | * | 10/2006 | Bigus et al. | ............... 706/10 |
| 7,188,170 | B1 | * | 3/2007 | Burnley et al. | ............... 709/224 |
| 7,210,119 | B2 | * | 4/2007 | Pothos et al. | ............... 717/102 |

(Continued)

FOREIGN PATENT DOCUMENTS

GB 2293675 A * 4/1996

(Continued)

OTHER PUBLICATIONS

Asami, et al Oracle Tuning and Monitoring Tool, "Aqua Systems Performance Analyzer 4", DB Magazine, Kabusikikaisha Shoueisha, Jul. 1, 2003, vol. 13, No. 4, pp. 202-207.

(Continued)

*Primary Examiner*—Meng-Ai An
*Assistant Examiner*—Kenneth Tang
(74) *Attorney, Agent, or Firm*—Brundidge & Stanger, P.C.

(57) ABSTRACT

A job scheduling management method is provided for managing job schedules. The management method includes the steps of monitoring an operating state of each of a plurality of computers to which one or more jobs are allocated, determining if the operating state meets a predetermined condition, if the operating state meets the predetermined condition, detecting an uncompleted job at a time when the predetermined condition is met from the jobs allocated to the computer, extracting another computer among the computers that is available to execute the detected uncompleted job based on information about one or more resources required for executing the detected uncompleted job, and allocating the detected uncompleted job to the extracted other computer.

9 Claims, 18 Drawing Sheets

U.S. PATENT DOCUMENTS

2002/0161902 A1* 10/2002 McMahan et al. ............ 709/229
2003/0074387 A1*  4/2003 Tanaka ....................... 709/103
2004/0158568 A1*  8/2004 Colle et al. ................. 707/100

FOREIGN PATENT DOCUMENTS

| JP | 61114363 | | 6/1986 |
| --- | --- | --- | --- |
| JP | 0830471 | | 2/1996 |
| JP | 08297643 | A * | 11/1996 |
| JP | 09237256 | A * | 9/1997 |
| JP | 11312149 | | 11/1999 |
| JP | 2000137692 | | 5/2000 |
| JP | 20027365 | | 1/2002 |
| JP | 2002108839 | A * | 4/2002 |
| JP | 2003178040 | | 6/2003 |

OTHER PUBLICATIONS

A. Takefusa, et al "Performance of a Deadline Scheduling Scheme on the Computational Grids", Proceedings of Joint Symposium on Parallel Processing, Information Processing Society, Jun. 5, 2001, vol. 2001, No. 6, pp. 263-270.

"SX System Software SUPER-UX Masterscope/SX Utilization Manual" 4$^{th}$ Edition, NEC, Jul. 2002, pp. 97-101.

Japanese Office Action dated Mar. 4, 2008, issued in corresponding Japanese Patent Application No. 2003-193259.

* cited by examiner

SCHEDULE TABLE 300

| EXECUTION START DATE AND TIME | FINAL END DATE AND TIME | MAXIMUM EXECUTION TIME | EXECUTION AGENT | EXECUTION JOB |
|---|---|---|---|---|
| 2002/11/10 10:00:00 | 2002/11/10 10:00:00 | 01:00 | AGENT 1 | JOB 1 |
| 2002/11/10 23:00:00 | 2002/11/11 00:00:00 | 00:30 | AGENT 2 | JOB 2 |
| WEDNESDAYS 12:00:00 | . | 02:00 | AGENT 3 | JOB 3 |
| ⋮ | ⋮ | ⋮ | ⋮ | ⋮ |

JOB TABLE 400

| JOB NAME 401 | CONTENT OF EXECUTION 402 | EXECUTION RESOURCE 403 | MAXIMUM PERMISSIBLE COST 404 | PRIORITY 405 |
|---|---|---|---|---|
| JOB 1 | CALCULATING PROCESS | CPU, MEMORY | 10 | A |
| JOB 2 | BATCH PROCESS | CPU, MEMORY, DISK | 20 | B |
| JOB 3 | DATABASE PROCESS | CPU, MEMORY, DATABASE APPLICATION PROGRAM, RESOURCE 2 | 70 | A |
| JOB 4 | DATABASE PROCESS | CPU, MEMORY, DATABASE APPLICATION PROGRAM, RESOURCE 1 | 30 | C |
| ... | ... | ... | ... | ... |

AGENT MANAGEMENT TABLE 500

| AGENT NAME | EXECUTION SERVER |
|---|---|
| AGENT 1 | EXECUTION SERVER 1 |
| AGENT 2 | EXECUTION SERVER 2 |
| AGENT 3 | EXECUTION SERVER 3 |
| AGENT 4 | EXECUTION SERVER 2 |
| ⋮ | ⋮ |

FIG. 6

INTER-RESOURCE DISTANCE MANAGEMENT TABLE 600

| | | | USING EXECUTION SERVER | | | |
|---|---|---|---|---|---|---|
| | | | EXECUTION SERVER 1 | EXECUTION SERVER 2 | EXECUTION SERVER 3 | ... |
| AVAILABLE RESOURCES | EXECUTION SERVER 1 | CPU | 5 | – | – | |
| | | MEMORY | 5 | – | – | |
| | | DISK | 5 | 15 | – | |
| | | DATABASE | 10 | 20 | – | |
| | | ... | | | | |
| | EXECUTION SERVER 2 | CPU | – | 5 | – | |
| | | MEMORY | – | 5 | – | |
| | | DISK | – | 5 | 15 | |
| | | ... | | | | |
| | EXECUTION SERVER 3 | CPU | – | – | 10 | |
| | | MEMORY | – | – | 5 | |
| | | DISK | 15 | 20 | 10 | |
| | | DATABASE | 15 | 30 | 10 | |
| | | ... | | | | |
| | RESOURCE 1 | DISK | 10 | – | 40 | |
| | RESOURCE 2 | DISK | | 20 | 40 | |
| | ... | | | | | |

FIG. 9

HISTORY PERFORMANCE TABLE 900

| COLLECTION TIME | CPU USAGE RATE | USING MEMORY AMOUNT | EMPTY DISK AMOUNT | AVERAGE DISK PROCESSING TIME | AVERAGE QUERY PROCESSING TIME | ... |
|---|---|---|---|---|---|---|
| 10:00:01 | 30% | 200MB | 1000MB | 0.5ms | 0.01ms | |
| 10:00:02 | 23% | 256MB | 900MB | 0.2ms | 0.02ms | |
| 10:00:03 | 10% | 128MB | 900MB | 0.6ms | 0.05ms | |
| 11:00:00 | 40% | 200MB | 500MB | 1.2ms | 0.25ms | |
| 11:00:01 | 14% | 250MB | 700MB | 0.3ms | 0.10ms | |
| ... | | | | | ... | ... |

FIG. 10

RESOURCE RESTRICTION TABLE 1000

| JOB | THRESHOLD VALUE EXCEEDING TIMES | THRESHOLD VALUE | | | ... |
| --- | --- | --- | --- | --- | --- |
| | | CPU USAGE RATE | USING MEMORY AMOUNT | EMPTY DISK CAPACITY | |
| JOB 1 | 2/3 TIME | 50% OR MORE | 384MB OR MORE | 200MB OR LESS | ... |
| JOB 2 | 2/3 TIME | 60% OR MORE | — | 300MB | — |
| JOB 3 | 1/1 TIME | 80% OR MORE | — | — | ... |
| ... | ... | ... | ... | ... | ... |

JOB SCHEDULING MANAGEMENT METHOD USING SYSTEM RESOURCES, AND A SYSTEM AND RECORDING MEDIUM FOR IMPLEMENTING THE METHOD

BACKGROUND OF THE INVENTION

The present invention relates to a job operation and management system for operating and managing a job. More particularly, the invention relates to job scheduling management method, system and program.

There has been known a technique of assembling as one job a series of related processes from a plurality of processes to be executed by a computer and causing a plurality of jobs to be executed in accordance with a schedule. In this type of technique, when a fault occurs, it is necessary to recover a job as fast as possible. In order to cope with occurrence of a fault, there has been known a technique of pre-specifying a plurality of computers that enable to execute the same job and selecting the most appropriate computer for fault recovery from the pre-specified computers when the job is to be re-executed. (For example, refer to JP-A-11-353284).

As another technique, there also has been known a technique of pre-specifying a plurality of computers that enable to execute all job steps with respect to a job composed of the job steps depending on one another, selecting from the pre-specified computers the most appropriate computer to executing the following job step while one job step is in execution, and causing the selected computers to execute the following job steps without causing the all job steps to be executed by a single computer. For example, refer to JP-A-2001-166956.

Moreover, there also has been known a technique of calculating a scheduled time of a process end of a job that has not been executed before a fault occurrence among the jobs registered in fixed correspondence with the computers respectively, assigning an execution sequence to only the jobs whose scheduled time of a process end is before the time when each job is to be ended in accordance with the sequences of the jobs extracted along the priority of each job, reconfiguring the schedule in accordance with the execution sequence of the jobs, and executing the jobs along the reconfigured schedule. For example, refer to JP-A-2001-350637.

The foregoing prior arts are intended to use a specific computer recognized in fixed correspondence with a specific job as a computer that enables to execute the specific job in place of another computer in which a fault occurs or a processing load is concentrated. In these prior arts, the job schedule is reconfigured in the specific computer recognized to execute the specific job. Hence, these prior arts are not intended to properly extract and select the replaceable computer in scheduling the job in accordance with the quality of the job such as one or more resources required for the corresponding execution with each job and the operating condition of the job. The job intended for reconfiguring the schedule concerns only a fault job and another job depending on the fault job.

Further, since the schedule is reconfigured in consideration with only the fault job and the job depending on the fault job, in the disclosures of these prior arts, no consideration is given to a job allocating state (for example, the allocated job that is independent of those jobs) of the replaceable computer when reconfiguring the schedule.

SUMMARY OF THE INVENTION

It is an object of the present invention to provide a job operation and management technique that is arranged in consideration of the foregoing problem.

It is another object of the present invention to provide a technique of reconfiguring a job schedule in consideration of another computer and another job schedule when a fault or a performance degrade occurs in a computer that executes the job.

An embodiment of the present invention concerns a job scheduling management method in a computer (such as an execution server) connected with a network or a management computer (a management dedicated server or an execution server serving as a management server as well) that manages a schedule of a job allocated to an agent program to be executed by the computer. A method according to one feature of the present invention comprises monitoring an operating state of each of computers to which jobs are allocated or a resource to be used by the computer, detecting an abnormal state, determining if the operating state meets a predetermined condition (for example, if the CPU usage rate, the using memory amount, and the empty disk capacity are enough, if a fault occurrence is detected, and so forth), if the operating state meets the predetermined condition, detecting an uncompleted job among the jobs allocated to the computers (such as an untouched job, an unfinished job, or a failed job), extracting another computer among the computers that is available to executing the detected uncompleted job based on resource information (such as a CPU, a memory, a disk or a database) required for executing the detected uncompleted job, and allocating the detected uncompleted job to the extracted another computer.

Further, a method according to another feature of the present invention comprises managing first information indicating correspondence between jobs and each computer to which the jobs are allocated, second information indicating one or more resources required for executing the jobs, and third information indicating one or more resources to be used by each computer, monitoring an operating state of the computer to which the jobs are allocated, determining if the operating state meets a predetermined condition, detecting an uncompleted job among the jobs allocated to the computers through the use of the first information, extracting resources required for executing the detected uncompleted job through the use of the second information, extracting another computer among the computers that is available to use the extracted resources, and allocating the detected uncompleted job to the extracted another computer.

Herein, when the detected uncompleted job is allocated to the extracted another computer, it is possible to reschedule all the jobs including the detected uncompleted job and the jobs that have been already allocated to the extracted another computer.

Further, when allocating the detected uncompleted job to the extracted other computer, it is possible to take the steps of detecting an uncompleted job of the jobs that have been already allocated to the extracted another computer through the use of the first information, extracting the resources required for executing the detected uncompleted job through the use of the second information, extracting a further computer that is available to use the extracted resources through the third information, and then allocating the detected uncompleted job to the extracted further computer.

Moreover, the management computer also manages the information indicating correspondence between the job and the time when the job has to be finished and the information indicating the time taken in executing the job. If it is predicted that the job may not be finished until a predetermined time when the job has to be finished, on the basis of the operating state of the computer for executing the job and the time taken in executing the job, it means that the predetermined condition is not met. Hence, it is possible to allocate an uncompleted job of the jobs allocated to the computer to another computer.

When allocating the detected uncompleted job to another computer, it is possible to allocate the detected uncompleted job to a plurality of other computers depending on the resources required for executing the job.

In carrying out the foregoing object, the present invention may take the forms of a system for realizing the aforementioned function, a program therefor, or a recording medium having stored the program therefor.

In addition, the other problems and their solutions of the present invention will become apparent from the detailed description to follow taken in conjunction with the accompanying drawings.

BRIEF DESCRIPTION OF THE DRAWINGS

FIG. 4 is a table showing an example of a data structure of a job table;

FIG. 6 is a table showing an example of a data structure of an inter-resource distance table;

FIG. 9 is a table showing an example of a data structure of a history performance table;

FIG. 10 is a table showing an example of a data structure of a resource restriction table;

DETAILED DESCRIPTION OF THE EMBODIMENTS

Figure 1:
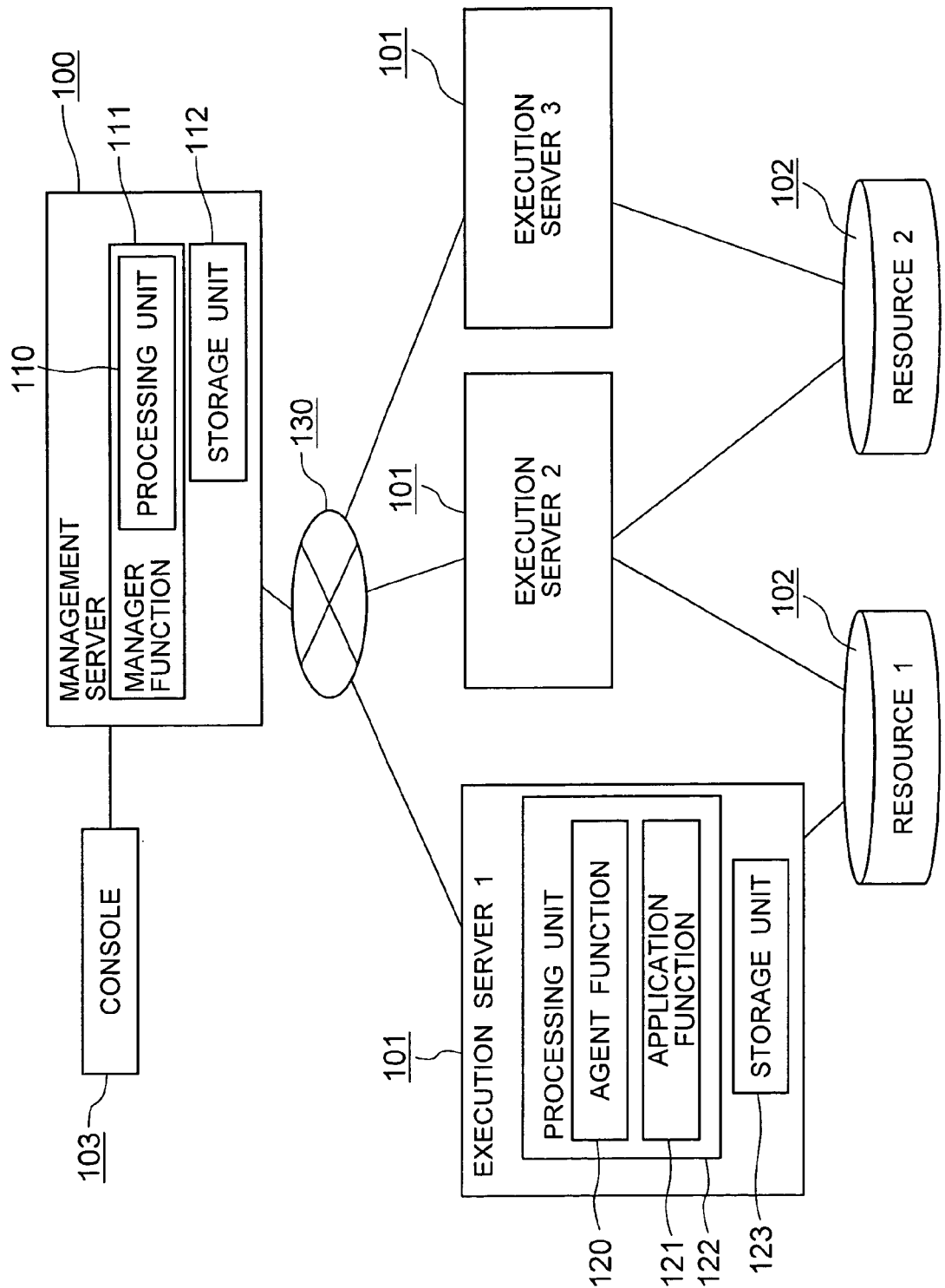
FIG. 1 is a block diagram showing an embodiment of an overall system configuration for executing a job.

Hereafter, the embodiments of the present invention will be described in detail with reference to the appended drawings. FIG. 1 is an overall block diagram showing an embodiment of a system configuration for executing a job.

In the present system, a management computer (in this embodiment, a server) 100 is connected with execution computers each for executing a job (in this embodiment, a server 1, a server 2 and a server 3) 101 through a network 130. As the execution server 101 may be used a single or plural servers. However, if the jobs to be executed by the execution servers do not depend on one another, a plurality of agents are provided in the overall system.

The management computer (server) 100 may be a dedicated computer (server) or implemented by the execution computer (server) 101. In this embodiment, the management computer (server) 100 is a dedicated computer (server) and includes a display unit for displaying information and an I/O unit composed of input devices such as a keyboard and a mouse. It is connected with a console 103 on which a job processing system is handled. The execution computer (server) 101 is connected with resources 1 and 2 (102) to be used by each execution server.

Herein, the term "resource" means a device to be used by each execution server, such as a CPU, a memory, a database, a disk unit, and a storage unit. Any device will do if it can obtain operating performance. In this embodiment, the resources 1 and 2 (102) are shown connected externally of the execution computer (server) 101. In place, these resources 1 and 2 may be located inside the execution computer (server) 101. Further, a SAN (Storage Area Network) environment may be configured between the resources 1 and 2 (102) and the execution computer 101. The present invention may be applied to the schedule management in a fail-over function or disaster recovery.

The management computer (server) 100 and the execution computer (server) 101 may be a mainframe or a server system. Further, they may be a general-purpose computer or arranged of dedicated hardware. In actual, the server is arranged to include a processing unit (control unit) such as a microprocessor chip for controlling the overall system and processing a program and a storage unit (storage device) (112 or 123) for holding a program and data.

The storage unit (112 or 123) is composed of a main storage device such as a memory, an auxiliary storage device such as a harddisk and a database. The storage unit 112 stores a manager program as well as data and a program to be held in the process of the management server 100. The storage unit 123 stores an agent program and an application program as well as data and a program to be held in the process of the execution server 101.

The functions of the management server 100 and the execution server 101 may be individually or combinationally managed according to their ways of use. A part of the function of the storage unit 112 or 123 may be managed as a solid database or a common database located externally of the management server 100 or the execution server 101.

As the program being stored in the storage unit (112 or 123) is executed by the processing unit (111 or 122), the management server 100 executes the manager 110 for a job itself or a job processing system for managing a job and the execution server 101 executes an agent 120 of a job processing system for collecting the operating performance of the resources for executing the job and the application (e.g. application program) being operated by the execution server. The application 121 is a commercially available application such as a database application.

The operating performance and the types of the available resources and the applications may be variable in each execution server.

Figures 2, 3:
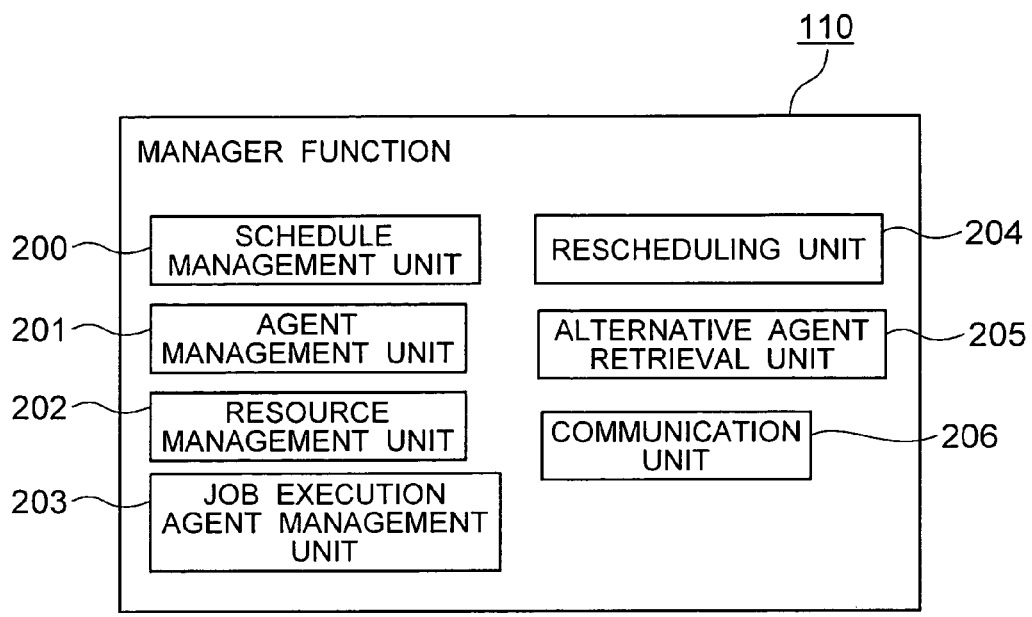
FIG. 2 is a function block diagram showing an embodiment of essential functions of a manager.
FIG. 3 is a table showing an example of a data structure of a schedule table.

FIG. 2 is a function block diagram showing one embodiment of an essential function of the manager 110.

The manager 110 includes a scheduling management unit 200 for managing a schedule of a job to be allocated to the execution server 101 and the agent 120, an agent management unit 201 for managing the agent 120 located in the execution server 101 managed by the management server 100, a resource management unit 202 for managing the resources 102 to be used by each execution server, the application 121 runs on each execution server, and a processing unit 122, an agent management unit for a job in execution (referred to as a job agent management unit) 203 for managing the agent 120 that is currently executing a job, a rescheduling unit 204 for reconfiguring a job schedule if a fault occurs or performance is degraded in the execution server 101, an alternative agent retrieval unit 205 for retrieving an execution server 101 having the resources required for executing a job or an agent located in the execution server, and a communication unit 206 for communicating with the manager 110 or another agent 120.

In order to realize this embodiment, the manager 110 operates to properly store in the storage unit 112 of the management server 100 a schedule table 300 (to be discussed below) for managing a time when a job execution is started and information of the execution server to be started, a job table 400 (to be discussed below) for managing jobs to be executed by the execution server 101, an agent management table 500 (to be discussed below) for managing information of the agent being managed by the manager, and an inter-resource distance table 600 (to be discussed below) for managing a relation of all resources to be used in the job processing system with the execution node that may use those resources, or to refer to the data to be stored in the table.

FIG. 3 shows an example of a data configuration of a schedule table 300.

This schedule table 300 is specified by an administrator and may be changed by the manager 110 in rescheduling a job. The scheduling management unit 200 of the manager 110 always monitors the schedule table 300 and then reports a job execution instruction to the execution server 101 through the communication unit 206 according to this table. After the job execution instruction is reported, the job agent management unit 203 starts to monitor the agent located in the execution server 101.

The schedule table 300 is information used for managing the operation of a job. Concretely, the information includes an execution start date and time 301, a final end date and time 302, a maximum execution time 303, and the information on the execution agent 304 for executing the job and the execution job 305 itself. The execution start date 301 indicates a date and a time when the job is to be started. If the job is regularly executed, it indicates its start time. The final end date and time 302 indicates a time when the job has to be finished or the job is intended to be finished. Unless limited, the final end date and time 302 is not necessarily specified in the table 300. The maximum execution time 303 indicates a maximum execution time or period of the job. If the execution time of the job exceeds this value, the manager 110 may take the time as an opportunity of reconfiguring the schedule. The execution agent 304 indicates an agent located in the execution server 101 for executing the job. The execution job 305 indicates a target job to be executed.

FIG. 4 shows an example of a data configuration of a job table 400.

The job table 400 is specified by an administrator and used for managing an execution content of a job. The table 400 includes information required for executing the job. The scheduling management unit 200 of the manager 110 selects the job to be executed from the schedule table 300 and then obtains the content of this job from this table.

Specifically, the job table 400 includes information about a job name 401, a content of execution 402, execution resources 403, a maximum permissible cost 404, and a priority 405. The job name 401 indicates a name of a job. The content of execution 402 indicates a content of a process to be executed by the job. The execution resources 403 represent the resources required for executing the job, such as a CPU, a memory, a disk device, a database application program, another resource 1, and another resource 2. For example, if a certain job requires the database application program and the disk device, these required resources are conditioned. The maximum permissible cost 404 indicates the maximum possible cost to be consumed in executing the job once.

Herein, the term "cost" means a value for representing a efficiency for use of the resources. As this value is smaller, the efficiency of executing the job is made higher. The value of the cost is calculated from a sum of a usage unit cost of each resource required for executing the job, for example. The priority 405 indicates a priority of each job. In this embodiment, the mark "A" means the highest priority and the mark "C" means the lowest priority.

Figure 5:
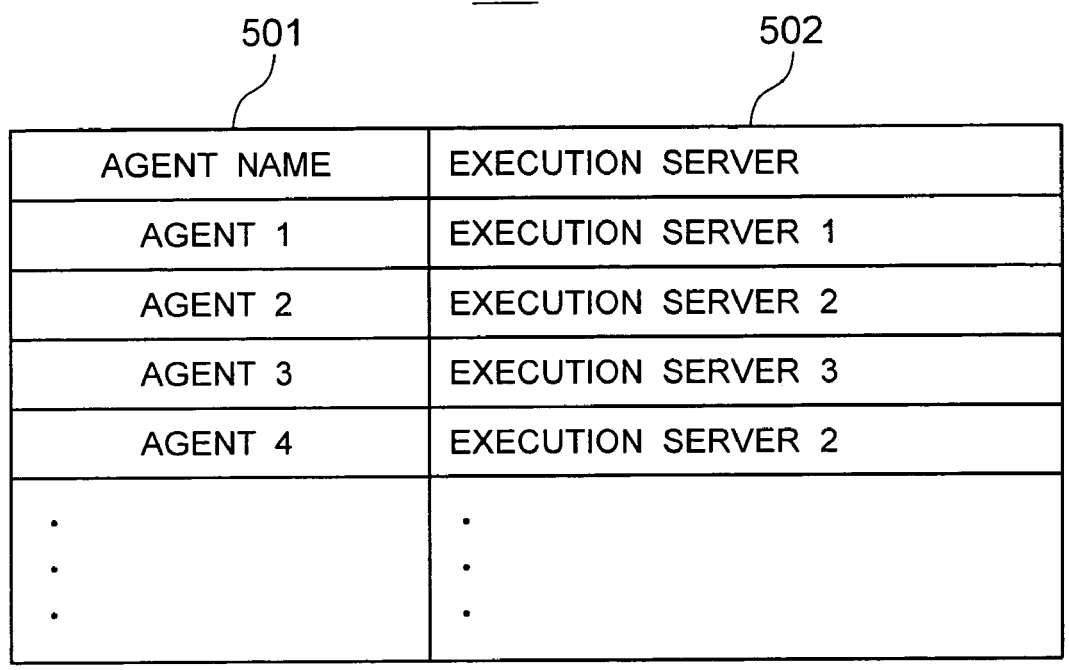
FIG. 5 is a view showing an example of a data structure of an agent management table.

FIG. 5 shows an example of a data configuration of an agent management table 500.

The agent management table 500 is a table that manages information about the agent 120 to be managed by the manager 110. The table 500 indicates a relation of an agent with its execution server 101.

Specifically, the agent name 501 indicates a name of an agent. The scheduling management unit 200 of the manager 110 obtains the agent 120 to be executed from the schedule table 300 and then obtains the execution server 101 in which the agent 120 is in operation. For example, a plurality of agents 120 may be specified in one execution server 101 in order to correspond the agents 2 and 4 with the execution server 2. If the execution server provides a plurality of agents, the execution server may process a plurality of jobs (in particular, which have no dependency on one another) in parallel.

FIG. 6 shows an example of a data configuration of an inter-resource distance table 600.

The inter-resource distance indicates a unit cost taken when the execution server 101 uses a resource. This value may be arbitrarily changed by the resource management unit 202, based on the operating performance obtained from the agent by the manager 110. In this embodiment, if no resource may be used (for example, if no resource is allocated or if a fault disables one or more resources to be active temporarily), no unit cost is represented.

If one or more resources may not be used, by holding the information on which it is determined if something like a fault temporarily makes the resource(s) inactive (how much of a recovery chance or how much of a unit cost if the resource is recovered), the information may be used as a determining material in reconfiguring the schedule.

Specifically, in the table 600, an available resource 601 indicates all resources to be used by the agent 120 managed by the manager 110. A using execution server 602 indicates the execution server 101 that may use the usable resource 601. For example, if an execution server may use the CPU of the execution server 1, the execution server corresponds to the execution server 1 and has a value of 5 as its using unit cost (603). Conversely, the CPU of the execution server 1 is not used by the execution servers 2 and 3. Further, the table 600 indicates that the disk of the resource 1 may be used by the execution servers 1 and 3 (604 and 605).

Moreover, the using unit cost of the resource is calculated from the operating performance of the resource collected by the agent 120 located in each execution server 101. For example, the unit cost of the disk is calculated from an average using time taken when the execution server 101 uses the resource and the average execution time of an I/O operation. Therefore, if the same resource is used, the unit cost is variable depending on the execution server 101 to be used. As the unit cost is smaller, the performance of the resource used by the execution server 101 becomes better.

In the foregoing embodiment, the schedule table 300, the job table 400, the agent management table 500, and the inter-resource distance table 600 are managed in an individual manner. Those tables may be managed as a series of data or the combinations of data items in these tables may be changed depending on the condition.

Figure 7:
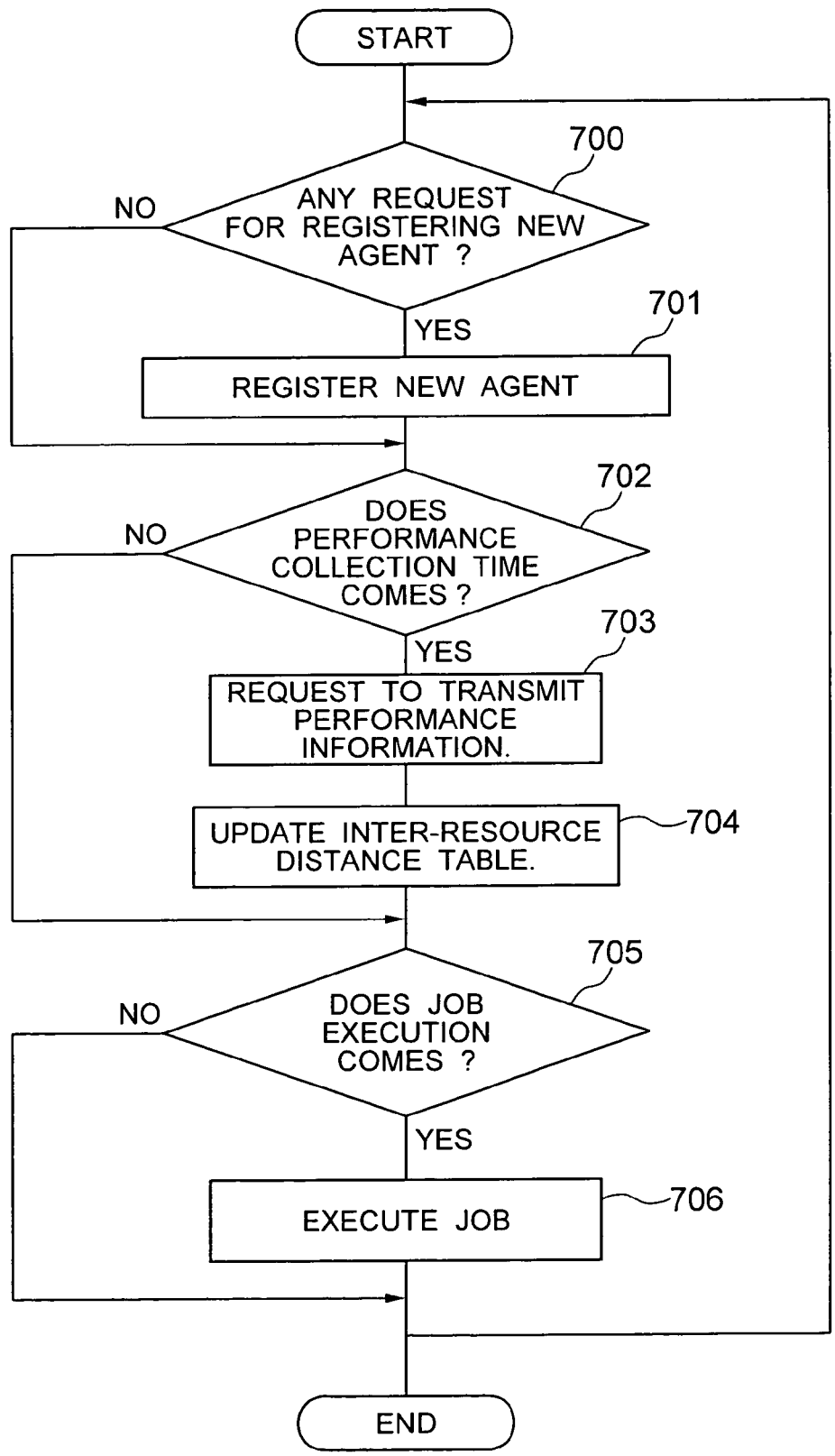
FIG. 7 is a flowchart showing an example of a basic process of a manager.

FIG. 7 is a flowchart for illustrating an example of a basic sequence of the manager 110.

If a new registering request is received from a new agent 120 (S700), the agent management unit 201 of the manager 110 registers in the agent management table 500 the new agent 120 in correspondence with the execution server (S701). As a method of monitoring the operating states of the execution server and the resource, the job agent management unit 203 of the manager 110 periodically gives an inquiry to the agent or is given a report by the agent according to the fault occurrence.

When the information about the operating performance is periodically collected from each agent 120, it is determined if the current time reaches a performance collection time (S702). If it does, the process is executed to request all agents 120 managed by the execution server to transmit the information about the current operating performance (S703). Based on the transmitted information about the operating performance, the inter-resource distance table is updated through the resource management unit 202 (S704).

The scheduling management unit 200 of the manager 110 retrieves the schedule table 300. If there exists a job in which the execution time comes (S705), the execution instruction of the job is transmitted (S706). If the job execution instruction is transmitted, the job agent management unit of the manager 110 starts to monitor the executing state of the job and the state of the agent 120 that is executing the job.

Figure 8:
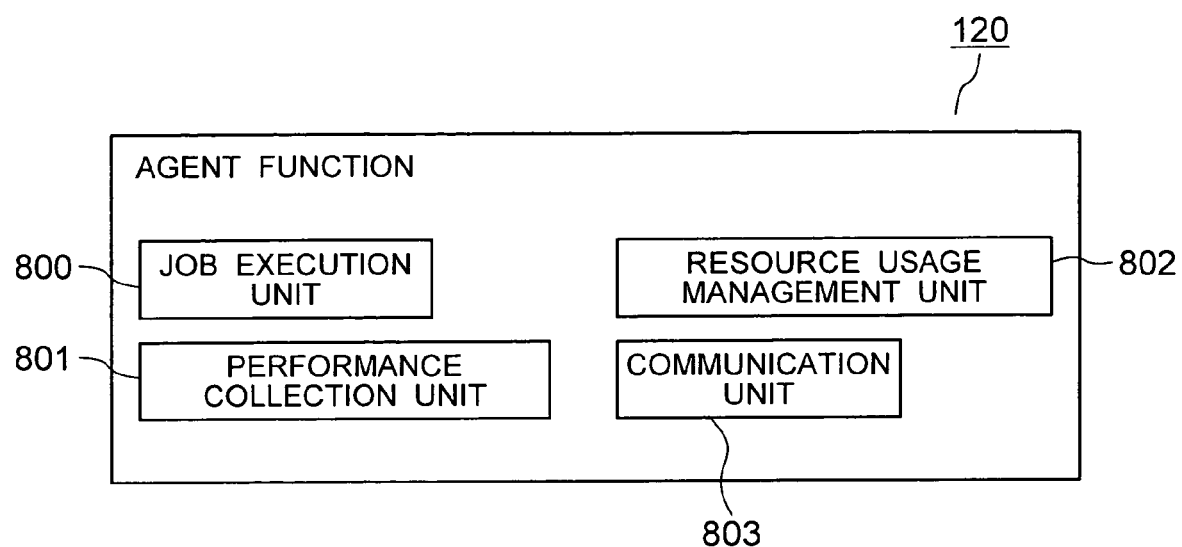
FIG. 8 is a function block diagram showing an embodiment of essential functions of an agent.

FIG. 8 is a function block diagram showing an embodiment of an essential function of the agent 120.

The agent 120 includes a job execution unit 800 for executing a job allocated by the manager 110, a performance collection unit 801 for collecting the information about the operating performance, and the resource usage management unit 802 for analyzing the state of the current execution server 101 from the collected information about the operating performance and calculating the using state of the optimal resource to executing the job, and a communication unit 803 for communicating the manager 110 with another agent 120.

The agent 120 appropriately stores in the storage unit 123 of the execution server 101 a history performance table 900 (to be discussed below) for accumulating the collected information about the operating performance and a resource restriction table 1000 (to be discussed below) for holding the condition in which the abnormal state of the resource takes place, or refers to the data being stored in the table. These functions of the agent 120 implement this embodiment.

When the agent 120 is given an execution instruction of the job by the manager 110, the agent 110 causes the job execution unit 800 to execute the job.

FIG. 9 shows an example of a data configuration of a history performance table 900.

The history performance table 900 is updated each time the performance collection unit 801 of the agent 120 accumulates the operating performance collected periodically or occasionally. Specifically, the history performance table 900 is composed of a collection time 901 and a collection item 902. The collection time 901 stores a time when the agent 120 collects the operating performance. The collection item 902 stores the collected operating performance of each item. For example, the operating performance of the CPU usage rate 903 is stored in the item 902. Moreover, the using memory amount, the empty disk amount, the disk operating performance (an average disk processing time 904), and the database application operating performance (an average query processing time 905) may be stored in the item 902.

FIG. 10 shows an example of a data configuration of a resource restriction table 1000.

The resource restriction table 1000 is a table specified by an administrator or updated by the resource usage management unit 802 of the agent 120. This table 1000 indicates the condition in which the state of the current resources is determined from the operating performance collected by the performance collection unit 801 of the agent 120. The state of the current resources is determined each time the performance collection unit 801 of the agent 120 collects the operating performance during the job execution.

Specifically, the resource restriction table 1000 includes a job 1001, a threshold value 1002, and threshold value exceeding times 1003. The job 1001 indicates a name of a job applied to the execution server. The threshold value 1002 indicates the condition in which it is determined if the state of the resources is abnormal on the collected operating performance. As the condition of the threshold value 1002 is specified a part of the collected operating performance. For example, the job 1 is recognized as an excess of the threshold value and is counted as a threshold value exceeding time if the empty disk capacity is 200 MB or less. A plurality of threshold values may be specified to one job 1001. The threshold value exceeding times 1003 indicates how many times the threshold value 1002 is exceeded. For example, if two of the three collected operating performances exceed the condition of the threshold value 1002, the job 1 is recognized as an abnormal state.

Figure 11:
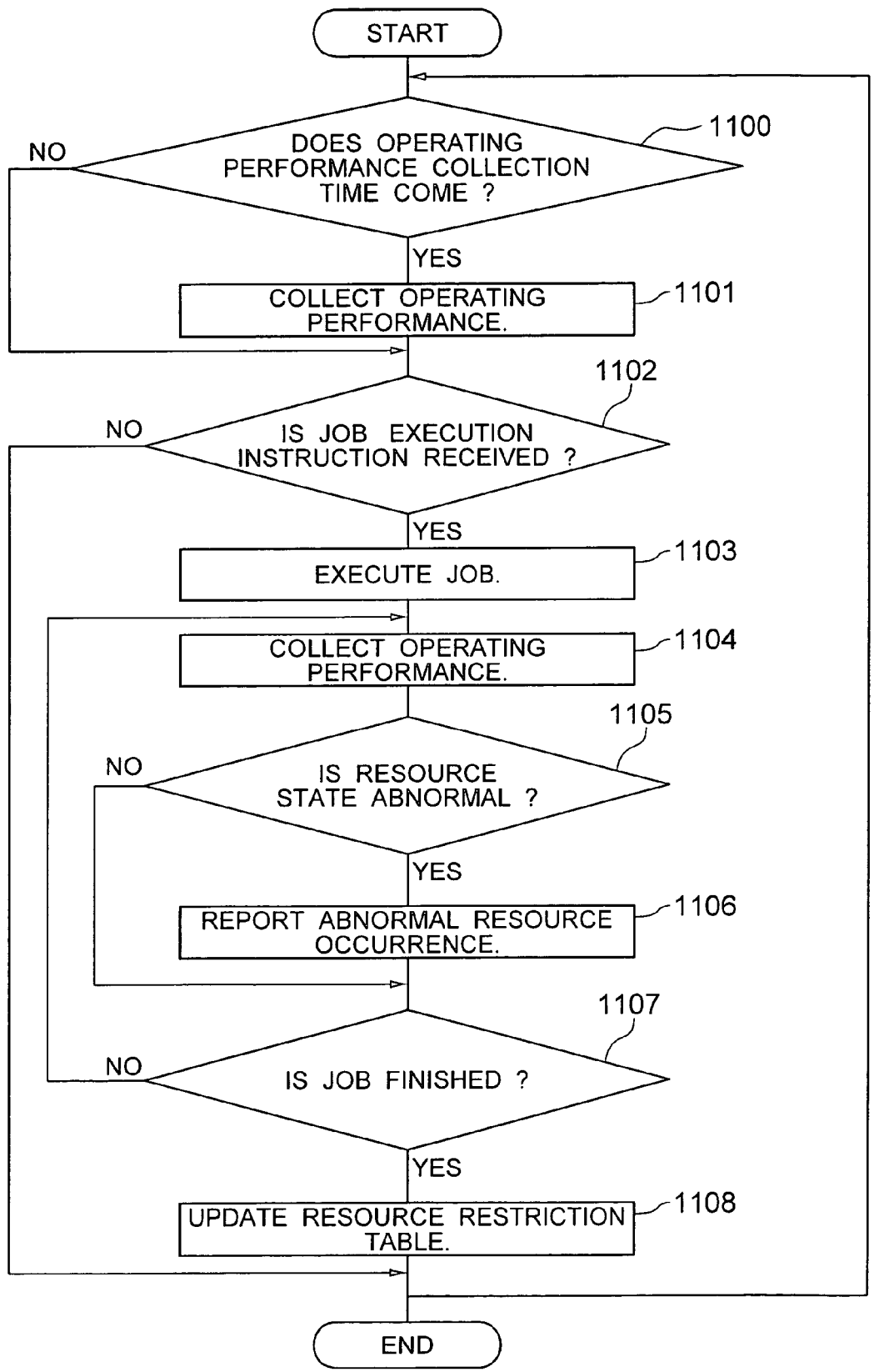
FIG. 11 is a flowchart showing an example of a basic process of an agent.

FIG. 11 is a flowchart for illustrating an example of a basic sequence of the agent 120.

The performance collection unit 801 of the agent 120 determines if the time reaches an operating performance collecting time (S1100), periodically collects the operating performances of the execution server 101 and the resources 102 to be used through the execution server 101 (S11101), and updates the history performance table 900. If a job execution instruction is received from the manager 110 (S1102), the agent 120 causes the job execution unit 800 to execute the job (S1103). During the job execution, the agent 120 causes the performance collection unit 801 to constantly collect the operating performance (S1104), and causes the resource usage management unit 802 to collate the collected operating performance with the condition of the resource restriction table 1000 and to monitor the state of the execution server 101 or the resource 120 (S1105). If the state of the resource is made abnormal, the agent 120 causes the communication unit 803 to notify the manager of the abnormal state (S1106). The process of the steps 1104 to 1106 is repeated until the job is finished. If the job is finished (S1107), the agent 120 causes the resource usage management to specify the next resource restriction from the resources used by the job, the state of the resources, the maximum execution time 303 of the job, and the actual execution time of the job (S1108).

Figure 12:
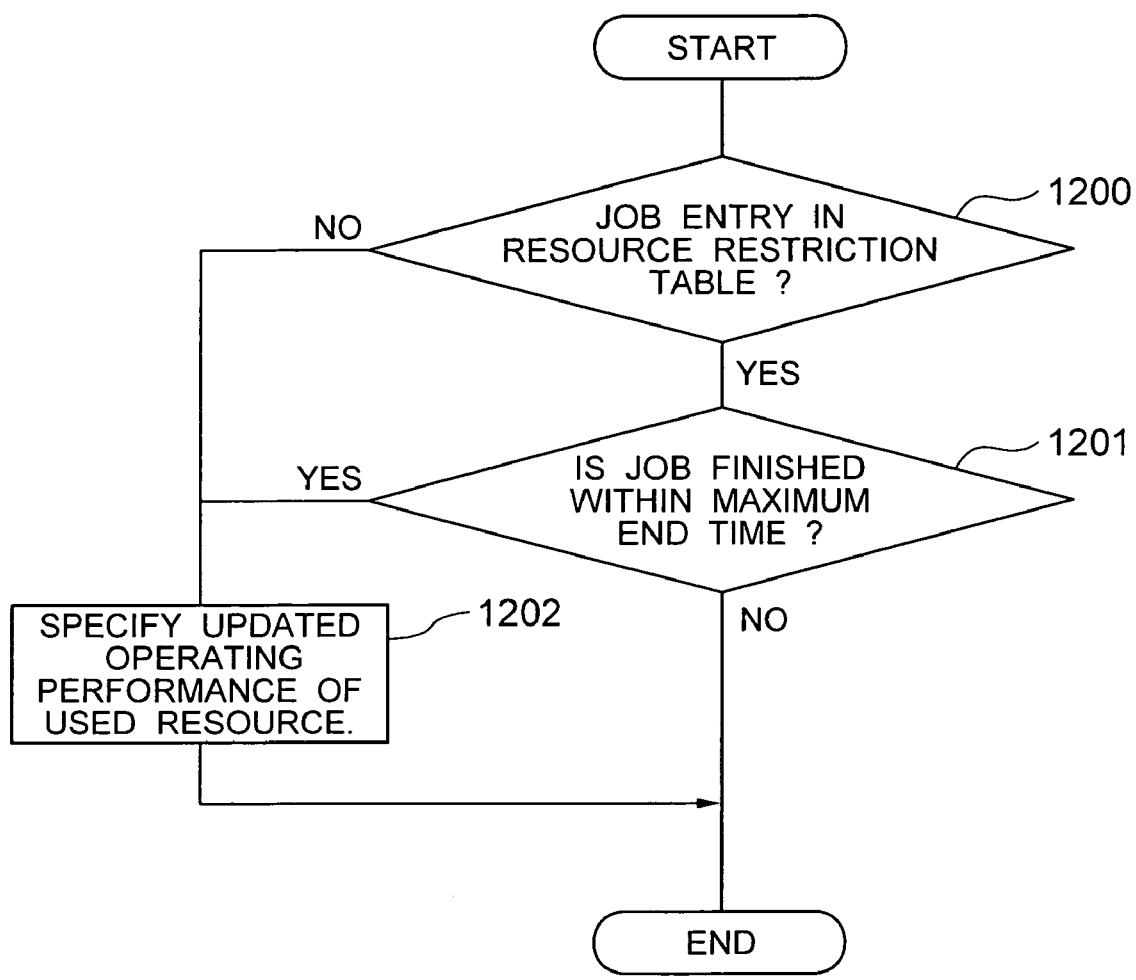
FIG. 12 is a flowchart showing an example of an update process of the resource restriction table.

FIG. 12 is a flowchart showing an operation of specifying a resource restriction (S1108). In a case that the condition of the executed job is not specified in the resource restriction table 1000 (S1200) and that the job is finished in the maximum execution time 303 (S1201), the operating performances of the resources used by the latest job are specified as the condition. In the other cases, the resource restriction table 1000 is not updated.

Figure 13:
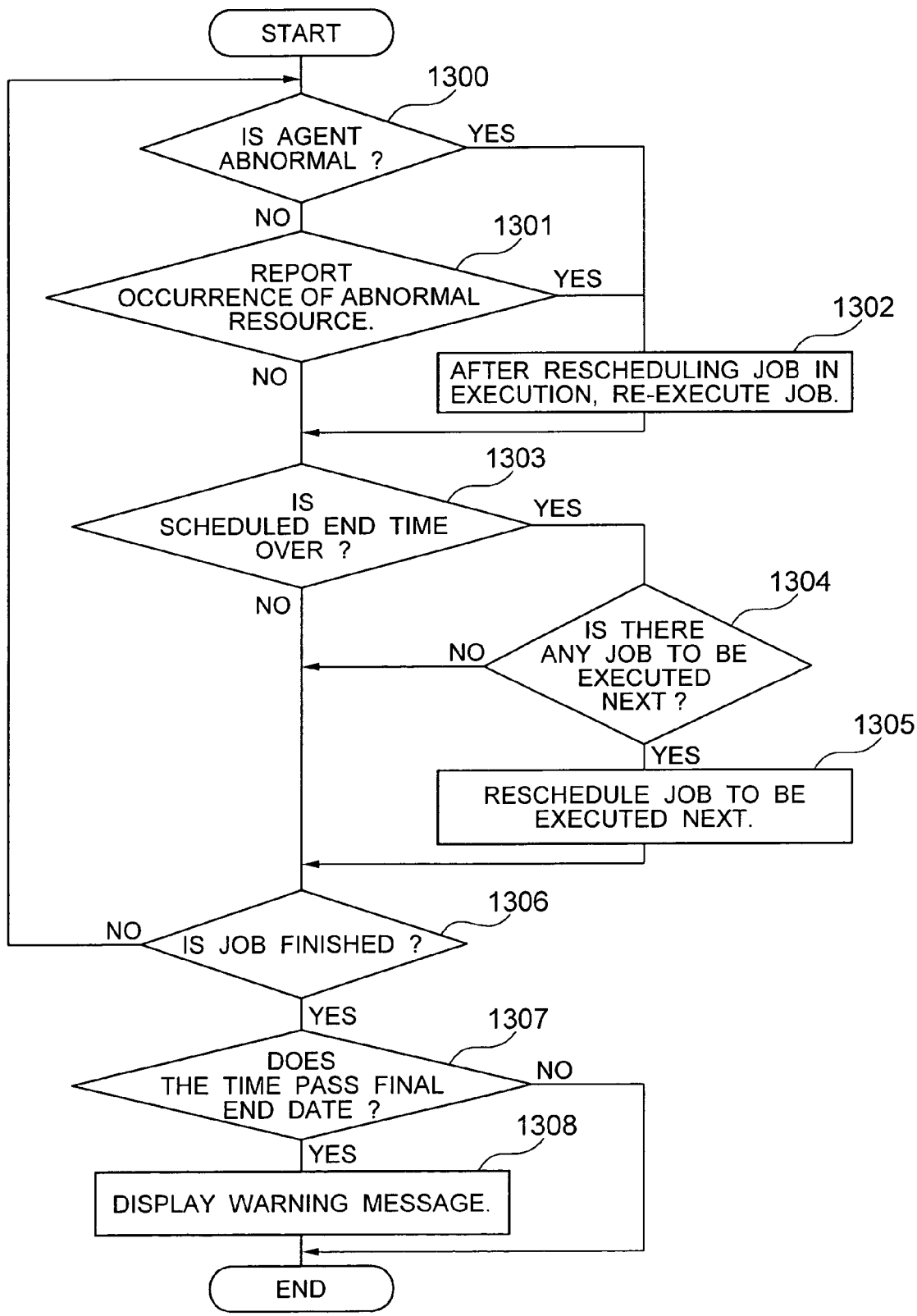
FIG. 13 is a flowchart showing an example of a process in an agent management unit during job execution of a manager.

FIG. 13 is a flowchart for illustrating a monitoring process of the job in execution and the agent 120 for executing the job.

The job agent management unit 203 of the manager 110 is monitoring the agent 120 until the job is finished (S1300 to S1306).

In a case that an abnormal state takes place in the agent (S1300), specifically, if a job execution instruction is transmitted and if no response is given by the agent 120, or in a case the resource(s) used by the agent 120 is determined as an abnormal state (an excess over a resource restriction or a fault of the resource itself) (S1301), the job being executed is determined to be failed (uncompleted). Then, the manager 110 causes the rescheduling unit 204 to reschedule the job being executed and then execute the job again (S1302). If the job is not finished until the time passes the maximum execution time of the job (S1303), the manager 110 causes the scheduling management unit 200 to retrieve the job scheduled next to the job being executed from the schedule table 300 (S1304) and specify the schedule to the job again (S1305). In a case that the job is finished (S1306) and the job execution time passes the final end date and time 303 (S1307), the manager 110 operates to output a warning message to the console from which the message is reported to the administrator (S1308).

Figure 14:
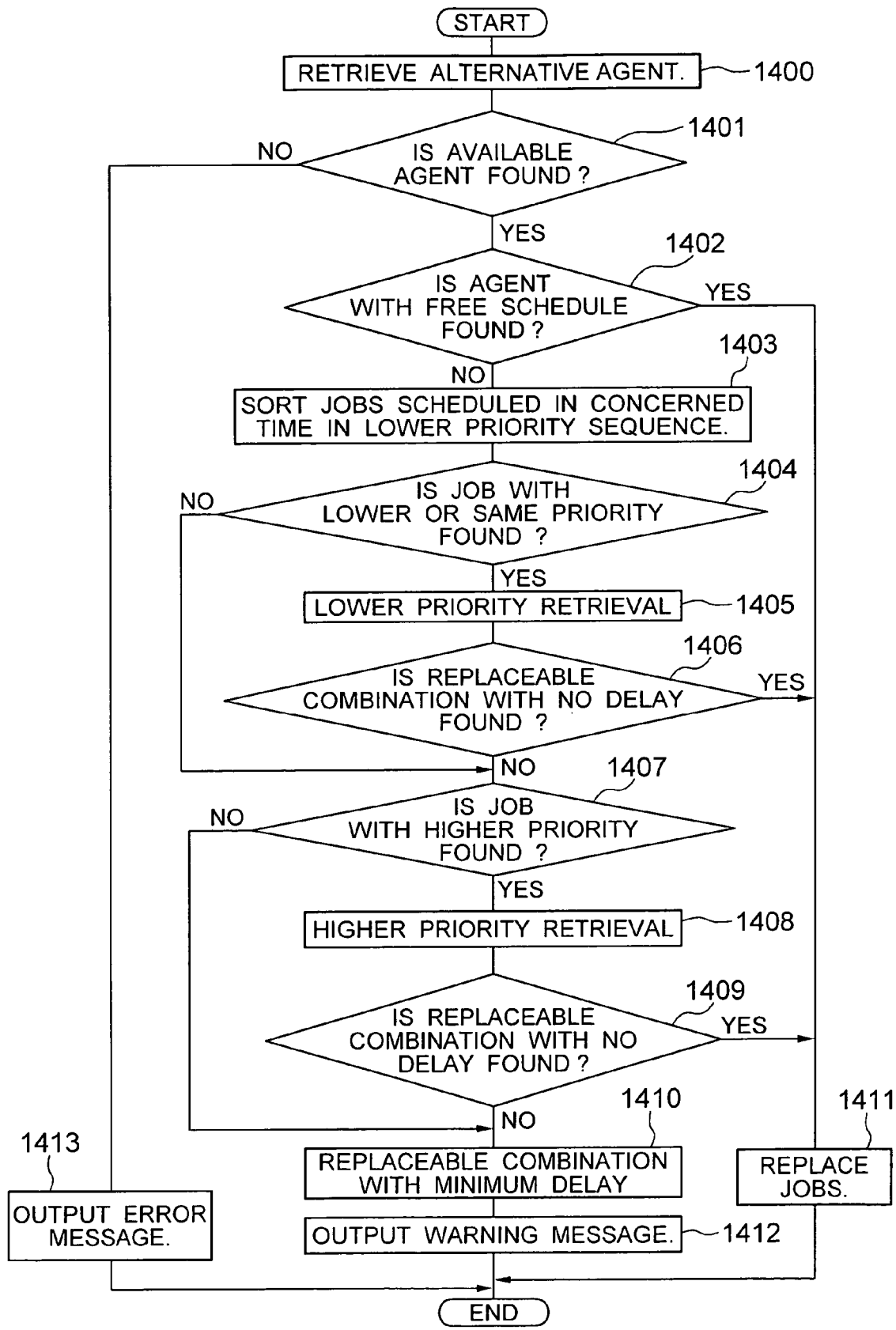
FIG. 14 is a flowchart showing an example of a process in a re-scheduling unit of the manager.

FIG. 14 is a flowchart for illustrating a process to be executed by the rescheduling unit 204 of the manager 110.

In rescheduling the job, the manager 110 causes the alternative agent retrieval unit 205 to retrieve the agent 120 that enables to execute the same job on the basis of the resources to be used by the execution server having the agent located therein through the use of the job table 400, the agent management table 500, and the inter-resource distance table 600 (S1400). The alternative agent retrieval unit 205 retrieves an alternative agent for rescheduling the job through the inter-resource distance table 600 on which the information about the operating performances of the resources is occasionally reflected. Hence, the job allocation is made possible according to the operating states of the resources.

If one or more alternative agents 120 are found (S1401), the process is executed to retrieve an agent in which a schedule of a job executing time is free from the alternative agents through the use of the schedule table 300 (S1402). If the agent with the free schedule is found ("Yes" in S1402), the execution agent 304 of the schedule table 300 is changed (S1411).

If no agent with a free schedule 120 is found ("No" in S1402), the schedule of the same executing time is specified to the agent retrieved in the step 1401 again. In this specification, the jobs scheduled in the same time are rearranged in priority sequence with reference to the priority 405 of the job table 400 (S1403). Then, if a job with lower priority than the delayed job or a job with the same priority is found ("Yes" in S1404), the jobs with lower priority are rescheduled (S1405). If the job with no delay is rescheduled ("Yes" in S1406), the schedule table 300 is changed and the job execution agent is changed (S1411).

If the job is delayed by the rescheduling operation or if the rescheduling of the job is not possible, the job with higher priority than the delayed job is retrieved for rescheduling. At first, it is checked if a job with higher priority than the delayed job is found. If it is found ("Yes" in S1407), the retrieval process is started (S1408). If the schedule with no delay may be retrieved ("Yes" in S1409), for replacing the jobs, the schedule table 300 is changed and then the job execution agent is changed as well (S1411). If the schedule with no delay cannot be found ("No" in S1409), the process is executed to replace the job with a delay with the job with a minimum delay based on the result of the lower priority retrieving process 1405, specify the schedule table 300 again (S1410), and output a warning message to the console 103 (S1412).

If not a single alternative agent 120 is found, an error message is outputted to the console 103 (S1413).

For rescheduling the agent retrieved in the steps S1400 and S1401, the rescheduling unit enables to sequentially reschedule the related agent recursively invoked from the rescheduling unit except the first call.

In addition, this flow may be properly rearranged. In some embodiments, the priority-based retrieval may be eliminated without specifying priority to each job.

Figure 15:
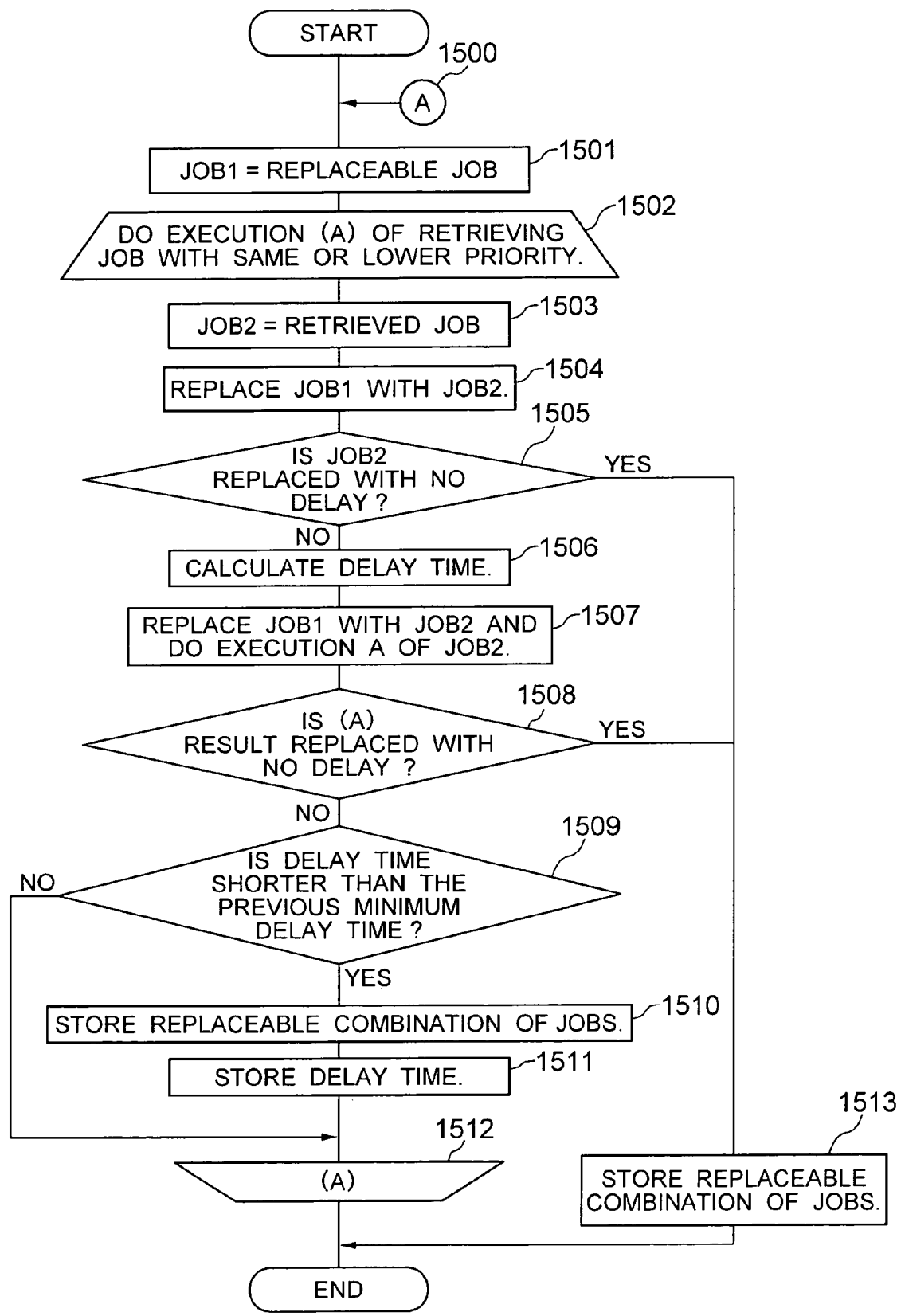
FIG. 15 is a flowchart showing an embodiment of a lower priority retrieving process.

FIG. 15 is a flowchart showing an embodiment of the lower priority retrieval process 1405.

In the lower priority retrieval process, the job to be replaced is assumed to be Job1 (S1501), and the job with the same priority as or lower priority than Job1 is retrieved (S1502 to S1512). At first, one of the jobs with the same or lower priority is specified as Job2 (S1503). When Job1 is replaced with Job2, if the rescheduling is executed without being later than the start time of Job2 ("Yes" in S1505), this combination of Job1 with Job2 is adopted and then the retrieval process is terminated (S1513).

If a delay takes place in the rescheduling ("No" in S1505), the delay time is calculated (S1506). The delay time means how long the job2 is delayed from the last end date and time 302 and is calculated by deriving the execution state date and time 301 after being replaced and adding the maximum execution time 303 to the derived execution start date and time 301.

Next, the lower priority retrieval process (higher priority retrieval process) is invoked again (S1507). This allows the process from the step 1500 to be recursively invoked. The process is executed to retrieve a replaceable combination of Jobs.

If the rescheduling may be executed without any delay of Job2 as a result of the process of the step 1507 ("Yes" in S1508), the retrieval is finished, and then the retrieved result is adopted as the rescheduling result (S1513).

If the combination without no delay is not retrieved ("No" in S1508), it is determined if the calculated delay time is smaller than the result retrieved in the past (S1509). If it is smaller, the replaceable combination of Jobs and its delay time are held (S1511 and S1512).

Figure 16:
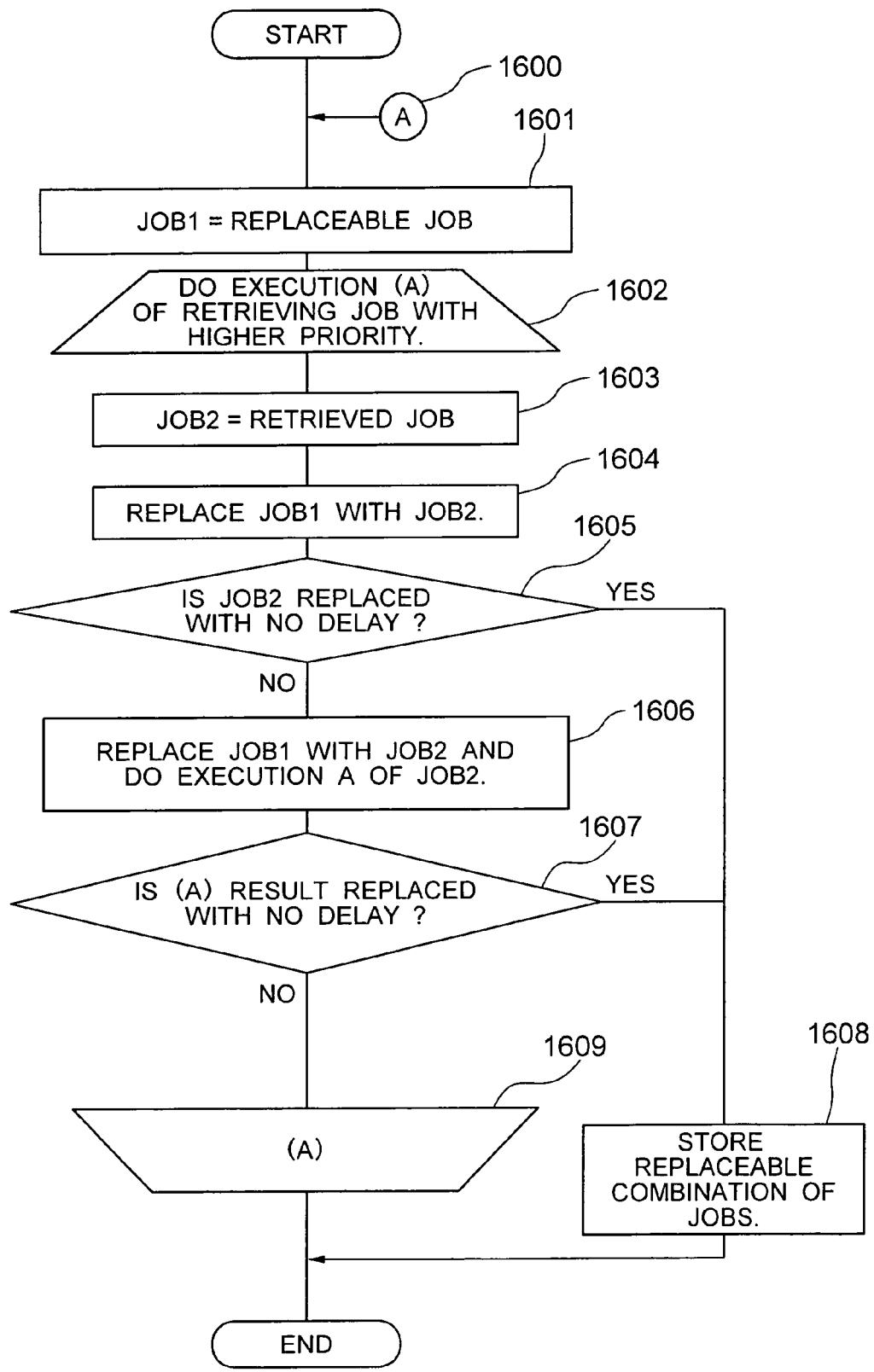
FIG. 16 is a flowchart showing an embodiment of a higher priority retrieving process.

FIG. 16 is a flowchart showing an embodiment of the higher priority retrieval process 1408.

In the higher priority retrieval process, the job to be replaced is assumed to be Job1 (S1601), and the retrieval process is executed with respect to the Job1 and the higher priority job (S1602 to S1609). At first, one of the jobs with higher priority is specified as Job2 (S1603). When replacing Job1 with Job2, if the rescheduling is executed without being later than the start time of Job2 ("Yes" in S1605), this replaceable combination is adopted and then the retrieval process is finished (S1608).

If a delay takes place ("No" in S1605), the higher priority retrieval process (lower priority retrieval process) is invoked again with respect to the Job2 (S1606). This allows the process from the step 1600 to be recursively invoked, so that the replaceable combination of the jobs may be retrieved.

If the rescheduling may be executed without any delay of Job2 as a result of the process of the step 1606 ("Yes" in S1607), the retrieval is finished. Then, the retrieved result is adopted as the rescheduling result (S1608). If no combination without any delay is retrieved ("No" in S1607), the retrieval process is finished without adopting the retrieved result.

Figure 17:
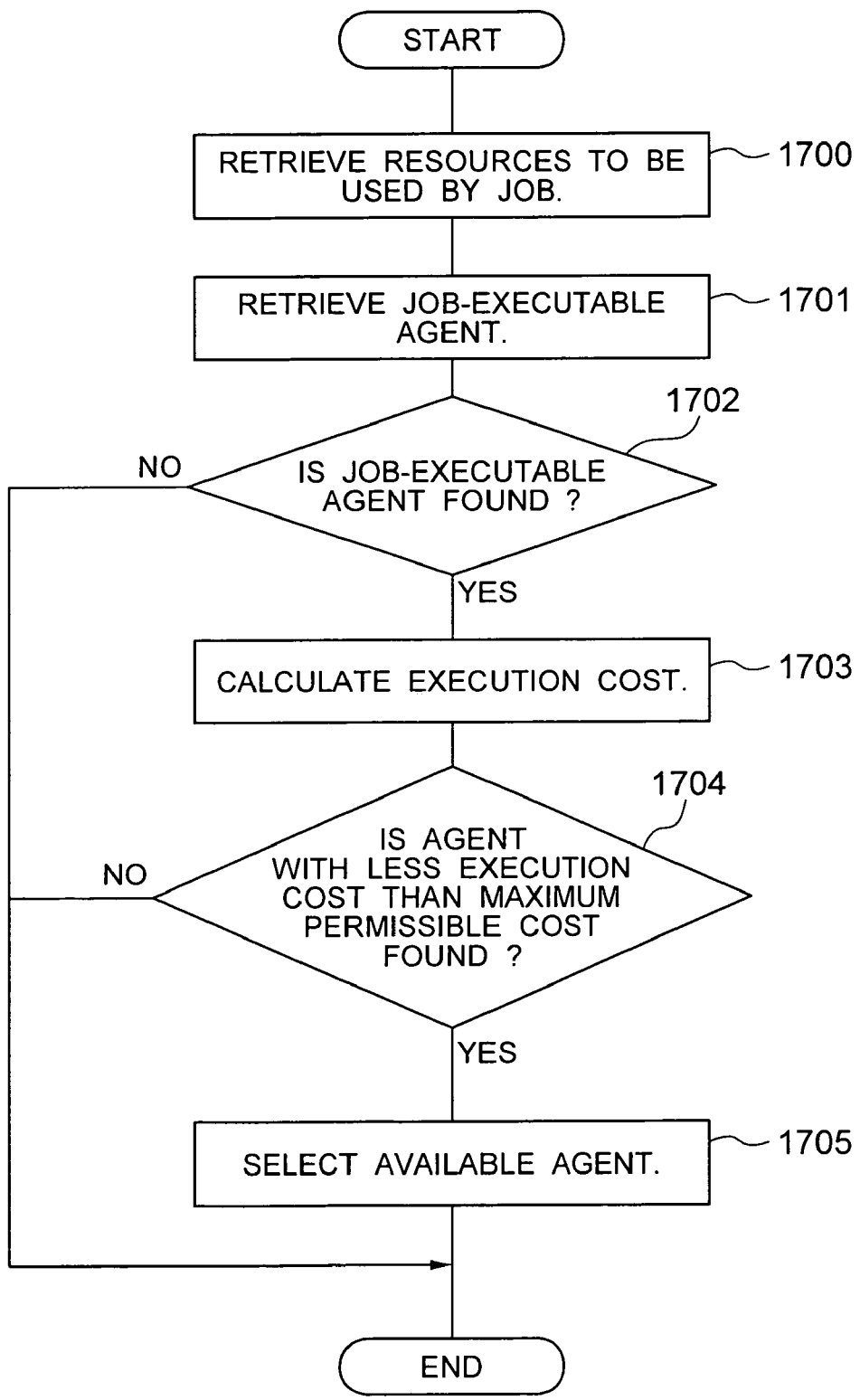
FIG. 17 is a flowchart showing an example of a process of a replacing agent retrieving unit of the manager.

FIG. 17 is a flowchart showing an example of the process of the alternative agent retrieval unit 205 of the manager 110 (corresponding to the process of the step 1400 in FIG. 14).

At first, the process is executed to obtain from the job table 400 the resources to be used by the rescheduled job (S1700). Then, the process is executed to retrieve the execution server 101 that enables to use all necessary resources from the inter-resource distance table 600 (S1701). If there exists the execution server 101 that enables to use the resources (S1702), the execution cost is calculated (S1703). The execution cost is arranged to be equal to or less than the maximum permissible cost in the job table 400 (S1704). The execution server 101 having the combination of such resources and the agent 120 that is operating in the server 101 are selected (S1705).

Further, when retrieving the execution server that enables to use all necessary resources from the inter-resource distance table in the step 1701, by combining the resources to be used by a plurality of execution servers, it is possible to specify the plurality of execution servers and the agents that are operating therein.

Figure 18A:
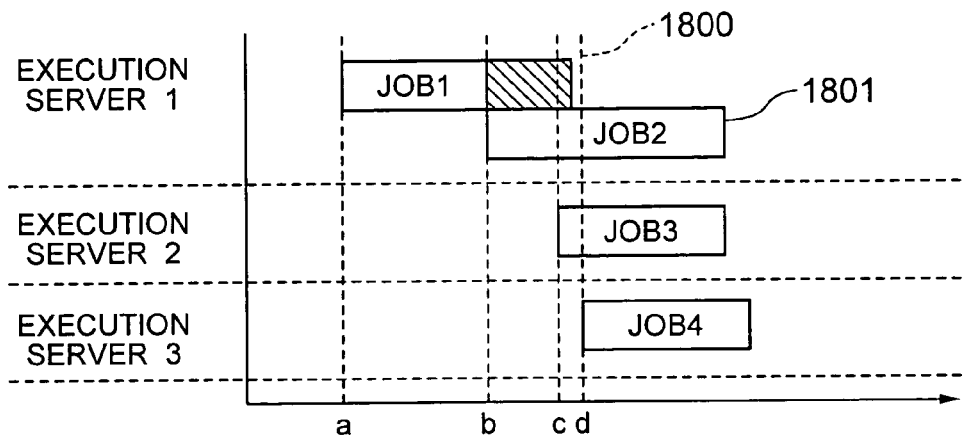
FIGS. 18A-18C are illustrations showing an embodiment of a reconfiguration of a schedule for executing a job.
Figure 18B:
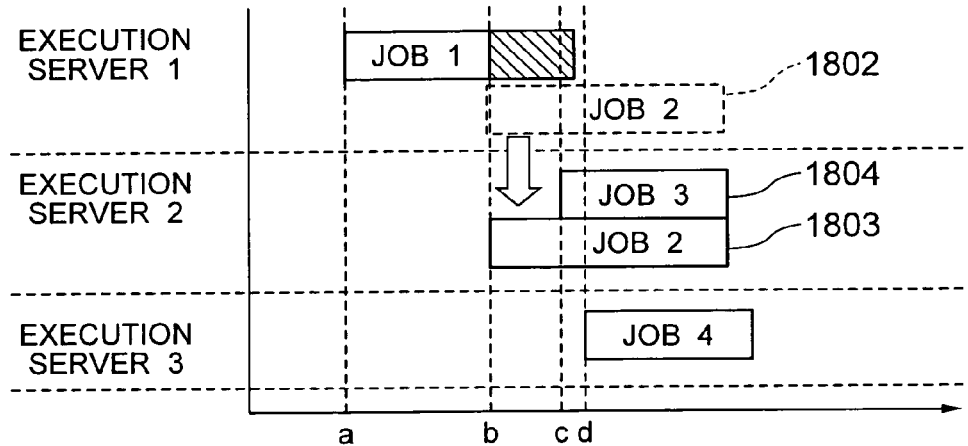
Figure 18C:
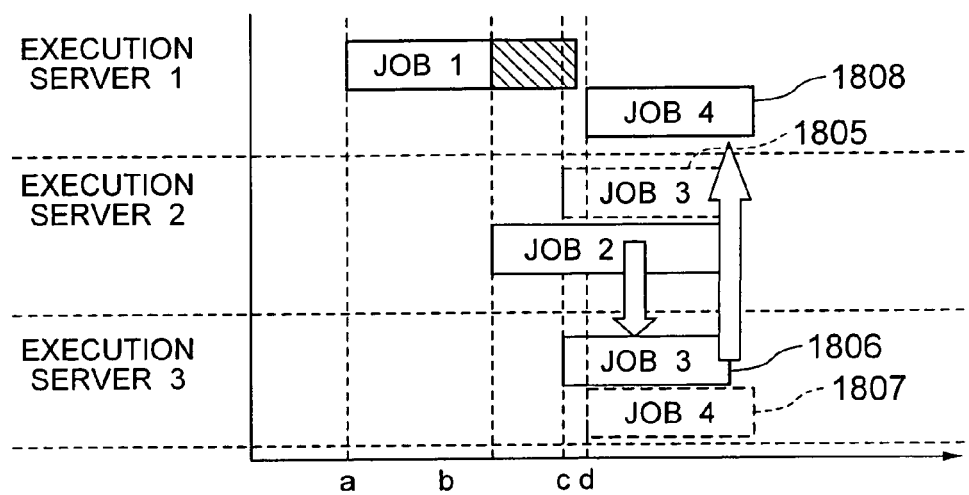

FIGS. 18A-18C show a concrete example of re-specifying a job schedule.

Consider the case that the job is scheduled as shown in FIG. 18A. The job table 400 and the inter-resource distance table 600 in this case are assumed to correspond to those shown in FIGS. 4 and 6, respectively.

The job 1 lags behind the scheduled end time (1800). The job agent management unit 203 of the manager 110 detects a lag of the job 1, searches any influence on the other jobs, and detects the influence on a job 2 to be scheduled next to the job 1 (1801).

Herein, the manager 110 executes the rescheduling of the job 2 by using the method described with reference to FIG. 14. For executing the job 2, it is necessary to use the CPU, the memory, and the disk (see FIG. 4). Though the job 2 may be executed by the execution servers 2 and 3 (see FIG. 6), only the execution 2 may be replaced because the maximum permissible costs of the execution servers 2 and 3 are 15 and 25, respectively (see FIGS. 4 and 6). Hence, the job 2 is rescheduled so that the execution server 2 may execute the job 2 (1802 and 1803). However, at the same time, the job 3 is scheduled in the execution server 2 (1804). It is thus necessary to rearrange the schedule of the job 3. Since the job 3 may be executed only by the execution server 3 (see FIG. 6), the job 3 is scheduled to be executed by the execution server 3 (1805 and 1806). However, since the job 4 has been scheduled at the same time (1807), it is necessary to reschedule the job 4. The job 4 may be executed by only the execution server 1 (see FIG. 6). Though the execution server 1 has been actually scheduled to execute the job 2, the previous rearrangement of the schedule causes the schedule to be partially free (1802). This is the end of rescheduling the job 4 (1807 and 1808).

The foregoing operation makes it possible to rearrange the schedules of all jobs, which suppress the adverse influence caused by the delay of the job 1 to a minimum.

Figure 19A:
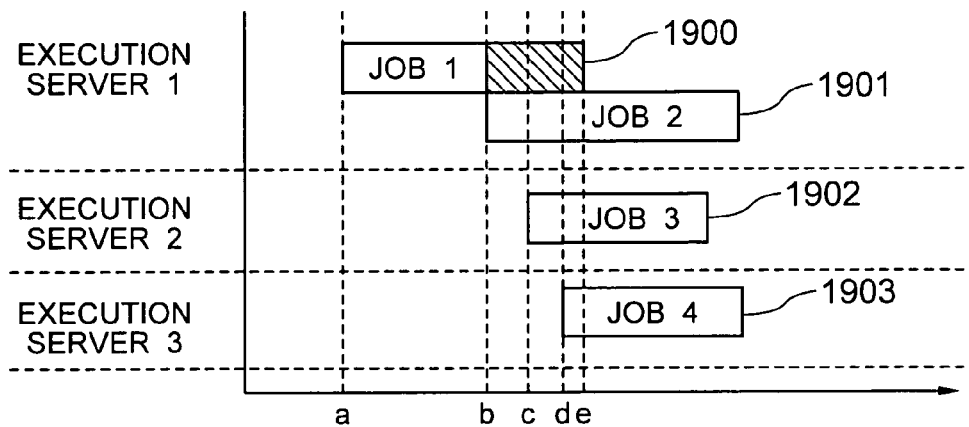
FIGS. 19A-19C are illustrations showing another embodiment of a reconfiguration of a schedule for executing a job.
Figure 19B:
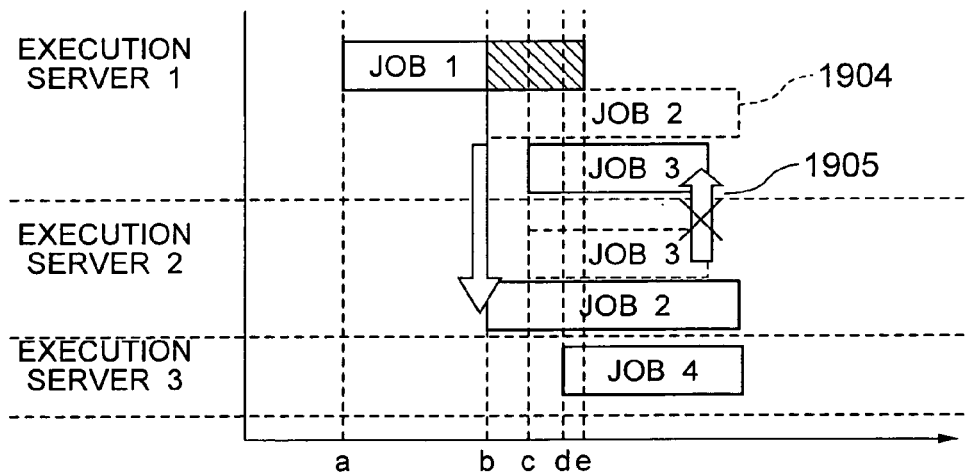
Figure 19C:
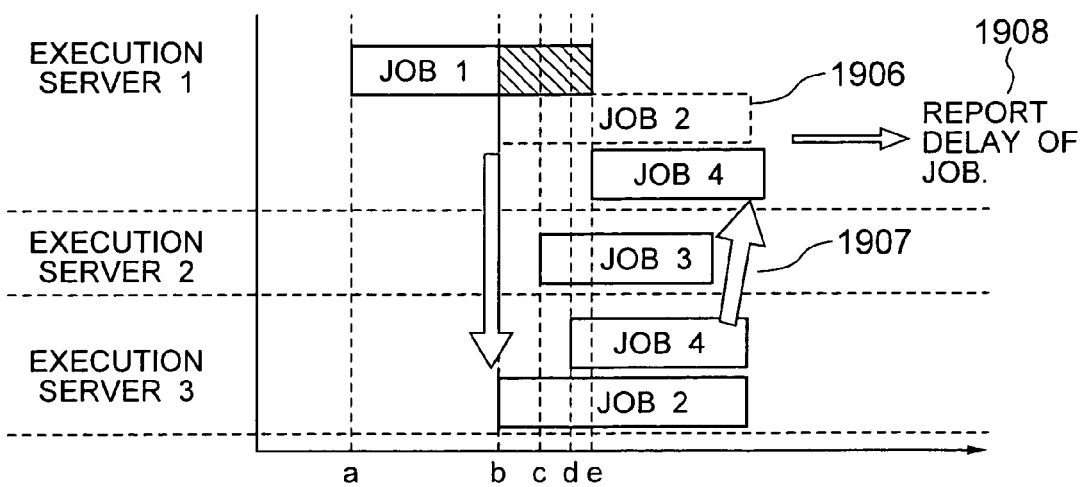

FIGS. 19A-19C show a concrete example of re-specifying the schedule of the job with the priority added thereto.

Consider the case that the job is scheduled as shown in FIG. 19A. The job 2 may be executed by any one of the execution servers 1, 2 and 3. The job 3 may be executed by the execution servers 1 and 2. The job 4 may be executed by the execution servers 1 and 3. As job priority, the job 2 is given priority B, the job 3 is given priority A, and the job 4 is given priority C. It means that the top priority is given to the job 3.

The job 1 lags behind the scheduled end time (1900). The manager 110 detects a time lag of the job 1, searches any influence on another job caused by the time lag, and detects the influence on the job 2 scheduled next to the job 1 (1901).

Herein, the manager 110 reschedules the jobs with the method described with reference to FIG. 14. The rescheduling may be executed by the execution servers 2 and 3, in which the jobs 3 and 4 are respectively scheduled at the same time slot (1902 and 1903). Considering the case that the job 2 is replaced with the job 3, the job 3 is shifted to the execution server 1, in which case a delay takes place (1904). However, since the job 3 is given higher priority than the job 2, this replacement is not made possible (1905).

In a case of replacing the job 2 with the job 4 (1906), like the job 3, the job 4 is delayed. However, since the job 4 is given lower priority than the job 2, the rescheduling is executed if delayed (1907).

Further, in this case, a warning message is outputted to the console 103 for the purpose of notifying the administrator of a delay (1908).

As set forth above, the embodiment of the present invention may offer a technique of, if a fault or performance degrade occurs in a computer for executing a job, rearranging a job schedule in consideration of the schedules of the other computers and jobs. Moreover, this embodiment may be arranged flexibly enough to add or delete an available resource and to execute the job process and the operation management as constantly making effective use of the resources unless the administrator changes the job execution schedule.

The foregoing embodiment may be modified in various modes without departing from the spirit of the invention.

According to the present invention, the job schedule may be flexibly rearranged according to the operating state of the resource.

What is claimed is:

1. A job scheduling management method for managing schedules of jobs allocated to a plurality of computers connected through a network, comprising the steps of:

monitoring a performance state of a resource of a computer, included in said plurality of computers, to which said jobs have been allocated, wherein said performance state includes first information indicating at least one of a usage rate of a Central Processing Unit (CPU) included in said computer, an amount of memory being used in said computer, an amount of empty space on a disk storage device included in said computer, an average processing time for the disk storage device, and an average query processing time for a database application being executed by said computer;

determining if said performance state meets a predetermined condition, wherein the determining is based on how many times said usage rate of said CPU exceeds a predetermined usage rate;

if said performance state meets said predetermined condition, detecting a job, of said jobs allocated to said computer, that is uncompleted at a time when said predetermined condition is met;

detecting a resource that is available to execute said detected uncompleted job based on second information concerning resources required for executing said detected uncompleted job,
  wherein said second information includes an inter-resource distance which is a cost value taken between an execution computer and resources of said plurality of computers, respectively when the execution computer of said computers uses an available resource included in a plurality of resources usable by said computers, the cost being defined as a value representing efficiency for use of said resources;

allocating said detected uncompleted job to said detected resource;

managing information indicating correspondence between said job and a time when said job is to be finished and information indicating a tome passed in executing said job; and determining that said predetermined condition is not met and allocating the uncompleted job of said jobs allocated to said computer to another computer if said management computer predicts that said job is not finished in the time when said job is to be finished from the performance state of said computer that executes said job and said time required for executing said job.

2. A job scheduling management method as claimed in claim 1, wherein the inter-resource distance is renewed by the operating performance of the resource and the execution computer, and the operating performance is detected at the time when a manager computer of said computer instructs a new agent of the execution computer after the new agent is registered.

3. A job scheduling management method in a management computer for allocating jobs to a plurality of computers connected though a network and managing a schedule of each of said jobs, comprising the steps of:

managing first information indicating correspondence between a job and a computer to which said job is allocated, second information indicating one or more resources required for executing said job, and third information indicating one or more resources to be used by each of said computers;

monitoring a performance state of a resource of said computer to which said job is allocated,
  wherein said performance state includes information indicating at least one of a usage rate of a Central Processing Unit (CPU) included in said computer, an amount of memory being used in said computer, an amount of empty space on a disk storage device included in said computer, an average processing time for the disk storage device, and an average query processing time for a database application being executed by said computer;

determining if said performance state meets a predetermined condition,
  wherein the determining is based on how many times said usage rate of said CPU exceeds a predetermined usage rate;

detecting an uncompleted job among said jobs allocated to said computers using said first information;

extracting one or more resources required for executing said detected uncompleted job using said second information,
  wherein said second information includes an inter-resource distance which is a cost value taken between an execution computer and resources of said computers, respectively when the execution computer of said computers uses an available resource included in a plurality of resources usable by said computers, the cost being defined as a value representing efficiency for use of said resources;

extracting a resource among said plurality of computers that is available to use said extracted resources using said third information;

allocating said detected uncompleted job to said extracted other resource;

managing information indicating correspondence between said job and a time when said job is to be finished and information indicating a time passed in executing said job; and determining that said predetermined condition is not met and allocating the uncompleted job of said jobs allocated to said computer to another computer if said management computer predicts that said job is not finished in the time when said job is to be finished from the performance state of said computer that executes said job and said time required for executing said job.

4. A job scheduling management method as claimed in claim 3, wherein, the allocating includes rescheduling said job and other jobs having been already allocated to said extracted other resource.

5. A job scheduling management method as claimed in claim 3, further comprising the steps of:

included in the allocating detecting an uncompleted job of said jobs having been already allocated to said extracted other resource using said first information;

extracting one or more further resources required for executing said detected uncompleted job using said second information;

extracting a further computer that is available to use said extracted further resources for said extracted other computer using said third information; and allocating said detected uncompleted job to said extracted further computer.

6. A job scheduling management method as claimed in claim 3, wherein said management computer allocates one or more jobs to itself.

7. A job scheduling management method as claimed in claim 3, wherein the allocating includes allocating said detected uncompleted job to a plurality of other computers among said plurality of computers according to one or more resources required for executing said job.

8. A job scheduling management computer for allocating jobs to a plurality of computers connected though a network and managing schedules of said jobs, comprising:

management means for managing first information indicating correspondence between a job and a computer to which said job is allocated, second information indicating one or more resources required for executing said job, and third information indicating one or more resources to be used by each of said computers;

monitoring means for monitoring a performance state of a resource of said computer to which said job is allocated,
  wherein said performance state includes information indicating at least one of a usage rate of a Central Processing Unit (CPU) included in said computer, an amount of memory being used in said computer, an amount of empty space on a disk storage device included in said computer, an average processing time for the disk storage device, and an average query processing time for a database application being executed by said computer;

means for determining if said performance state meets a predetermined condition based on how many times said usage rate of said CPU exceeds a predetermined usage rate;

means for detecting an uncompleted job among said jobs allocated to said computers using said first information, and extracting one or more resources required for executing said detected uncompleted job using said second information, wherein said second information includes an inter-resource distance which is a cost value taken between an execution computer and resources of said computers, respectively when the execution computer of said computers uses an available resource included in a plurality of resources usable by said computers, the cost being defined as a value representing efficiency for use of said resources;

means for extracting another resource among said plurality of computers that is available to use said extracted resources using said third information, and allocating said detected uncompleted job to said extracted other resource;

means for managing information indicating correspondence between said job and a time when said job is to be finished and information indicating a time passed in executing said job; and means for determining that said predetermined condition is not met and allocating the uncompleted job of said jobs allocated to said computer to another computer if said management computer predicts that said job is not finished in the time when said job is to be finished from the performance state of said computer that executes said job and said time required for executing said job.

9. A computer readable storage medium storing a job scheduling management program ford upon being executed by a plurality of computer, tangibly performing functions including allocating jobs to said computers which are connected to each other though a network and are used by a management computer for managing schedules of said jobs, said job scheduling management program comprising:

a function of managing first information for indicating correspondence between a job and a computer to which said job is allocated, second information indicating one or more resources required for executing said job, and third information for indicating one or more resources to be used by each of said computers;

a function of monitoring a performance state of a resource of said computer to which said job is allocated, wherein said performance state includes information indicating at least one of a usage rate of a Central Processing Unit (CPU) included in said computer, an amount of memory being used in said computer, an amount of empty space on a disk storage device included in said computer, an average processing time for the disk storage device, and an average query processing time for a database application being executed by said computer;

a function of determining if said performance state meets a predetermined condition based on how many times said usage rate of said CPU exceeds a predetermined usage rate;

a function of detecting an uncompleted job of said jobs allocated to said computers using said first information;

a function of extracting one or more resources required for executing said detected uncompleted job using said second information, wherein said second information includes an inter-resource distance which is a cost value taken between an execution computer and resources of said computers, respectively when an the execution computer of said computers uses an available resource included in a plurality of resources usable by said computers, the cost being defined as a value representing efficiency for use of said resources;

a function of extracting a resource among said plurality of resources that enables to use said extracted resources using said third information;

a function of allocating said detected uncompleted job to said extracted other resource;

a function of managing information indicating correspondence between said job and a time when said job is to be finished and information indicating a time passed in executing said job; and a function of determining that said predetermined condition is not met and allocating the uncompleted job of said jobs allocated to said computer to another computer if said management computer predicts that said job is not finished in the time when said job is to be finished from the performance state of said computer that executes said job and said time required for executing said job.

* * * * *